US011935466B2

(12) United States Patent
Li et al.

(10) Patent No.: US 11,935,466 B2
(45) Date of Patent: Mar. 19, 2024

(54) METHOD FOR ADJUSTING GAMMA CURVE, DEVICE FOR ADJUSTING GAMMA CURVE, AND DISPLAY DEVICE

(71) Applicant: KUNSHAN GO-VISIONOX OPTO-ELECTRONICS CO., LTD, Jiangsu (CN)

(72) Inventors: Yong Li, Kunshan (CN); Yahui Liu, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 0 days.

(21) Appl. No.: 18/169,383

(22) Filed: Feb. 15, 2023

(65) Prior Publication Data

US 2023/0196995 A1 Jun. 22, 2023

Related U.S. Application Data

(63) Continuation of application No. PCT/CN2021/112676, filed on Aug. 16, 2021.

(30) Foreign Application Priority Data

Nov. 24, 2020 (CN) ........................ 202011331247.3

(51) Int. Cl.
*G09G 3/3225* (2016.01)

(52) U.S. Cl.
CPC ... *G09G 3/3225* (2013.01); *G09G 2320/0233* (2013.01); *G09G 2320/0242* (2013.01); *G09G 2320/0673* (2013.01)

(58) Field of Classification Search
CPC ......... G09G 3/3225; G09G 2320/0233; G09G 2320/0242; G09G 2320/0673; G09G 3/3208; G09G 2340/0435
See application file for complete search history.

(56) References Cited

U.S. PATENT DOCUMENTS

2007/0075957 A1* 4/2007 Chen .................... G09G 3/3685 345/98
2013/0099692 A1* 4/2013 Chaji .................. G09G 3/3233 315/224
2018/0090084 A1 3/2018 Zheng et al.

FOREIGN PATENT DOCUMENTS

CN 1934607 A 3/2007
CN 106373516 A 2/2017
(Continued)

OTHER PUBLICATIONS

International Search Report dated Oct. 28, 2021, in corresponding International Application No. PCT/CN2021/112676, 5 pages.
(Continued)

*Primary Examiner* — Stephen G Sherman
(74) *Attorney, Agent, or Firm* — Maier & Maier, PLLC

(57) ABSTRACT

A method for adjusting a gamma curve, a device for adjusting a gamma curve, and a display device. The method for adjusting a gamma curve includes that: a reference duty cycle of a light-emitting control signal is determined according to a duty cycle of the light-emitting control signal at a preset refresh rate; a third refresh rate is determined according to the light-emitting control signal at a first refresh rate, the light-emitting control signal at a second refresh rate and the reference duty cycle, where the third refresh rate is between the first refresh rate and the second refresh rate, and the duty cycle of the light-emitting control signal at the third refresh rate is equal to the reference duty cycle; and the gamma curve is adjusted according to the third refresh rate.

12 Claims, 6 Drawing Sheets

(56) References Cited

FOREIGN PATENT DOCUMENTS

| | | | | | |
|---|---|---|---|---|---|
| CN | 108109583 A | | 6/2018 | | |
| CN | 110491351 A | | 11/2019 | | |
| CN | 110675824 A | | 1/2020 | | |
| CN | 107274854 B | | 3/2020 | | |
| CN | 111312145 A | | 6/2020 | | |
| CN | 111554218 A | * | 8/2020 | ............ | G09G 3/006 |
| CN | 111554218 A | | 8/2020 | | |
| CN | 111968582 A | | 11/2020 | | |
| CN | 112365839 A | | 2/2021 | | |

OTHER PUBLICATIONS

Office Action dated Jun. 11, 2021, in related Chinese Patent Application No. 202011331247.3, 13 pages.

Office Action dated Nov. 25, 2021, in related Chinese Patent Application No. 202011331247.3, 11 pages.

* cited by examiner

METHOD FOR ADJUSTING GAMMA CURVE, DEVICE FOR ADJUSTING GAMMA CURVE, AND DISPLAY DEVICE

CROSS-REFERENCE TO RELATED APPLICATIONS

This is a Continuation Application of International Patent Application No. PCT/CN2021/112676, filed on Aug. 16, 2021, which claims priority to Chinese Patent Application No. 202011331247.3 filed on Nov. 24, 2020, the disclosures of which are incorporated herein by reference in their entireties.

TECHNICAL FIELD

The present application relates to the field of display technologies, and in particular, a method for adjusting a gamma curve, a device for adjusting a gamma curve, and a display device.

BACKGROUND

An organic light-emitting diode (OLED) display device is a mainstream direction in the market currently, and the market demand is large, but the challenge is also large.

When the OLED display device supports multiple refresh rates, an issue of luminance and color coordinate offset exists between different refresh rates due to the fact that a gamma curve is shared, so that the display function of the display device is influenced.

SUMMARY

The present application provides a method for adjusting a gamma curve, a device for adjusting a gamma curve, and a display device, so as to improve an issue of luminance and color coordinate offset and improve a display function of the display device.

In a first aspect, the present application provides a method for adjusting a gamma curve. The method includes that: a reference duty cycle of a light-emitting control signal is determined according to a duty cycle of the light-emitting control signal at a preset refresh rate; a third refresh rate is determined according to the light-emitting control signal at a first refresh rate, the light-emitting control signal at a second refresh rate and the reference duty cycle, where the third refresh rate is between the first refresh rate and the second refresh rate, and the duty cycle of the light-emitting control signal at the third refresh rate is equal to the reference duty cycle; and the gamma curve is adjusted according to the third refresh rate.

In a second aspect, the present application provides a device for adjusting a gamma curve. The device for adjusting the gamma curve is configured to perform the method for adjusting a gamma curve described in the first aspect. The adjustment device includes a reference duty cycle acquisition module, a third refresh rate calculation module and a gamma curve adjustment module. The reference duty cycle acquisition module is configured to determine a reference duty cycle of a light-emitting control signal according to a duty cycle of the light-emitting control signal at a preset refresh rate. The third refresh rate calculation module is configured to determine a third refresh rate according to the light-emitting control signal at a first refresh rate, the light-emitting control signal at a second refresh rate and the reference duty cycle, where the third refresh rate is between the first refresh rate and the second refresh rate, and the duty cycle of the light-emitting control signal at the third refresh rate is equal to the reference duty cycle. The gamma curve adjustment module is configured to adjust the gamma curve according to the third refresh rate.

In a third aspect, the present application provides a display device. The display device includes a gamma curve storage unit, the gamma curve storage unit is configured to store a gamma curve acquired by the method for adjusting the gamma curve described according to the first aspect.

The present application provides the method for adjusting the gamma curve, the device for adjusting the gamma curve, and the display device. The method for adjusting the gamma curve includes that: the reference duty cycle of the light-emitting control signal is determined according to the duty cycle of the light-emitting control signal at the preset refresh rate; the third refresh rate is determined according to the light-emitting control signal at the first refresh rate, the light-emitting control signal at the second refresh rate and the reference duty cycle, where the third refresh rate is between the first refresh rate and the second refresh rate, and the duty cycle of the light-emitting control signal at the third refresh rate is equal to the reference duty cycle; and the gamma curve is adjusted according to the third refresh rate. According to the technical scheme provided in the present application, the gamma curve is adjusted by using the third refresh rate between the first refresh rate and the second refresh rate, at a same gray scale, a deviation of a gray-level voltage of the adjusted gamma curve relative to a gray-level voltage of the gamma curve corresponding to the first refresh rate and a deviation of the gray-level voltage of the adjusted gamma curve relative to a gray-level voltage of the gamma curve corresponding to the second refresh rate each are less than a deviation between the gray-level voltage of the gamma curve corresponding to the first refresh rate and the gray-level voltage of the gamma curve corresponding to the second refresh rate. Therefore, when the display is switched between the first refresh rate and the second refresh rate, a difference between a gate potential of the drive transistor and the gray-level voltages of the gamma curve at different refresh rates may be reduced. Thus, the color offset degree at which the first refresh rate and the second refresh rate are switched is reduced, an issue of luminance and color coordinate offset existing between different refresh rates when the gamma curve is shared is improved, and the display function of the display device is improved.

DETAILED DESCRIPTION

Figure 1:
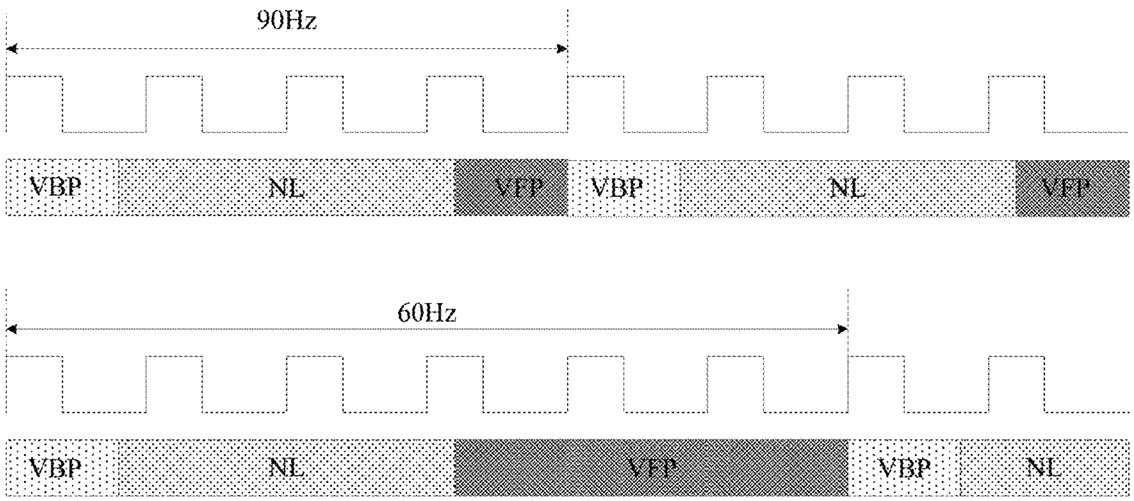
FIG. 1 is a timing comparison diagram of a light-emitting control signal at a high refresh rate and a light-emitting control signal at a low refresh rate in the related art.

The present application will be further described in detail in conjunction with the drawings and embodiments below. It should be understood that the specific embodiments described herein are merely used for explaining the present application and are not intended to limit the present application. It should also be noted that, for ease of description, only some, but not all, of the structures related to the present application are shown in the drawings.

High refresh rate applications are increasingly widespread in an OLED display device, and thus the OLED display device needs to support multiple refresh rates. For the display effect, a gamma curve is adjusted at each refresh rate, which results in too long debugging time during production and the reduction of production efficiency. A scheme of sharing a gamma curve may be used for the OLED display device to reduce the debugging time during production. However, since the non-display time is different at different refresh rates, which causes different discharge times of a gate capacitance of a drive transistor, if the gamma curve is shared, the difference in the discharge times will cause the issue of luminance and color coordinate offset between different refresh rates.

FIG. 1 is a timing comparison diagram of a light-emitting control signal at a high refresh rate and a light-emitting control signal at a low refresh rate in the related art. Referring to FIG. 1, the high refresh rate is 90 Hz and the low refresh rate is 60 Hz, and a vertical back porch (VBP) time in one frame at the high refresh rate is equal to a VBP time in one frame at the low refresh rate. Also, N Line (NL) scan time in one frame at the high refresh rate is equal to NL scan time in one frame at the low refresh rate. However, a vertical front porch (VFP) time in one frame at the high refresh rate is different than a VFP time in one frame at the low refresh rate, i.e., the non-display time is different in length. When the refresh rate is 90 Hz, a luminance adjustment interval of the light-emitting control signal is 4 pulse signals, and when the refresh rate is 60 Hz, the luminance adjustment interval of the light-emitting control signal is changed to 6 pulse signals by increasing the VFP time, so as to ensure no change in a pulse width modulation (PWM) duty cycle before and after the switching. When the refresh rate is switched from 90 Hz to 60 Hz, the amount of change in non-display time is too large, whereby a difference in discharge time of the gate capacitance of the drive transistor is too large, so that a difference of the gate potential of the drive transistor is relatively larger, namely, the ΔVdata is too large. A discharge formula of the gate capacitance of the drive transistor is determined based on the following:

$$V\text{data}=V0*e^{-t/RC}.$$

V0 is a gray-scale voltage corresponding to the gamma curve, t is a discharge time, R is an equivalent resistance value of a discharge loop, and C is a gate capacitance value of the drive transistor.

If the gamma curve is a gamma curve adjusted at the refresh rate of 90 Hz, when the refresh rate of 60 Hz is shared, Δt1=1/60−1/90. That is, the time corresponding to one frame at a refresh rate of 90 Hz is 1/90 s, the time corresponding to one frame at the refresh rate of 60 Hz is 1/60 s, the discharge time at the refresh rate of 60 Hz is increased by Δt1=1/60−1/90 relative to the discharge time at the refresh rate of 90 Hz, and thus a difference between a gate potential of the drive transistor at the refresh rate of 90 Hz and a gate potential of the drive transistor at the refresh rate of 60 Hz is as follows: ΔVdata=V0*e^−Δt1/RC, which causes a serious issue of a low luminance and a low gray-scale color offset after the refresh rate is switched to 60 Hz. If the gamma curve is a gamma curve adjusted at the refresh rate of 60 Hz, and when the refresh rate of 90 Hz is shared, the serious issue of a low luminance and a low gray-scale color offset after the refresh rate is switched from 60 Hz to 90 Hz. If the gamma curve is adjusted at one refresh rate of the refresh rate of 90 Hz or the refresh rate of 60 Hz, the difference in discharge time will cause the serious issue of a low luminance and a low gray-scale color offset after the display is switched to the other refresh rate.

Figure 2:
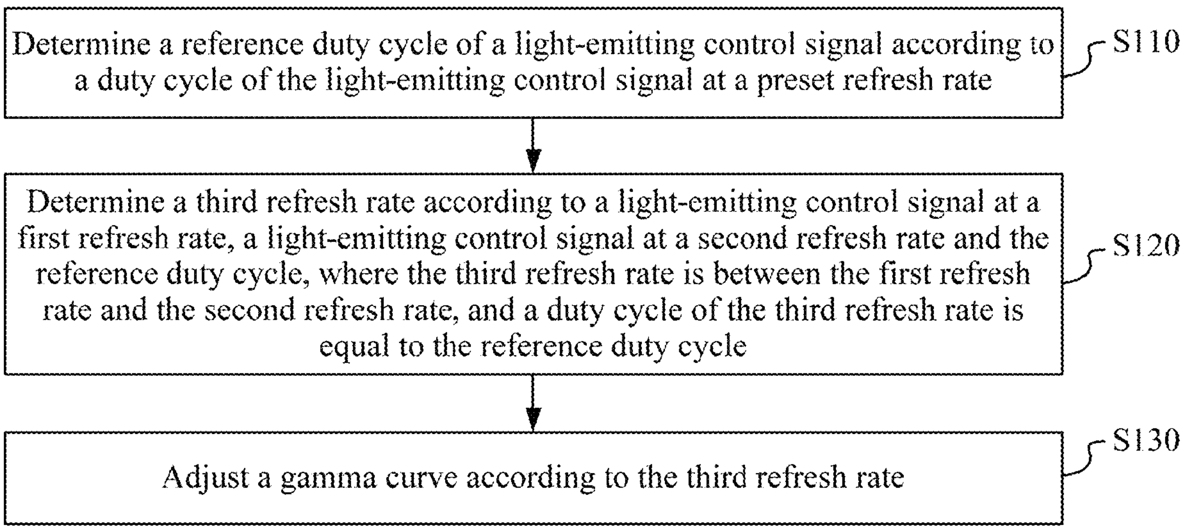
FIG. 2 is a flowchart of a method for adjusting a gamma curve according to the present application.

Based on the above issues, the present application provides a method for adjusting a gamma curve. FIG. 2 is a flowchart of a method for adjusting a gamma curve according to the present application. With reference to FIG. 2, the method includes the steps described below.

In S110, a reference duty cycle of a light-emitting control signal is determined according to a duty cycle of the light-emitting control signal at a preset refresh rate.

Specifically, the gamma curve may be adjusted by adjusting a light-emitting control signal and adjusting a data voltage on a data signal line. The light-emitting control signal may be adjusted by adjusting a duty cycle of the light-emitting control signal. The OLED display device may support multiple refresh rates, and each refresh rate is a preset refresh rate for the OLED display device. The duty cycles of the light-emitting control signals at each refresh rate may be the same so as to ensure the same luminance of the OLED display device at different refresh rates. At this time, the reference duty cycle of the light-emitting control signal of the OLED display device may be determined according to the duty cycle of the light-emitting control signal at one refresh rate supported by the OLED display device, so as to ensure that the duty cycles of the light-emitting control signals at different refresh rates are equal to the reference duty cycle when the refresh rate is subsequently adjusted, whereby the luminance of the OLED display device at different refresh rates is ensured to be the same.

In S120, a third refresh rate is determined according to a light-emitting control signal at a first refresh rate, a light-emitting control signal at a second refresh rate and the reference duty cycle, where the third refresh rate is between the first refresh rate and the second refresh rate, and a duty cycle of the light-emitting control signal at the third refresh rate is equal to the reference duty cycle.

Specifically, the multiple refresh rates include a first refresh rate and a second refresh rate, the first refresh rate may be the highest refresh rate with the shortest frame period, and the second refresh rate may be the lowest refresh rate with the longest frame period. The third refresh rate is determined according to the first refresh rate and the second refresh rate, so that the third refresh rate is between the first refresh rate and the second refresh rate, and further, a gray-level voltage of a gamma curve adjusted according to the third refresh rate at a same gray level can be between a gray-level voltage of a gamma curve corresponding to the first refresh rate and a gray-level voltage of a gamma curve corresponding to the second refresh rate. Moreover, the duty cycle of the light-emitting control signal at the third refresh rate is equal to the reference duty cycle, which ensures that a luminance of the OLED display device at the third refresh rate is the same as a luminance of the OLED display device at other preset refresh rates. It should be noted that the third refresh rate here refers to a refresh rate that is between the first refresh rate and the second refresh rate. Multiple refresh rates may be included between the first refresh rate and the second refresh rate.

In S130, the gamma curve is adjusted according to the third refresh rate.

Specifically, if the gamma curve is shared and the gamma curve is adjusted at one refresh rate of the first refresh rate or the second refresh rate, the difference in discharge time will cause a serious issue of a low luminance and a low gray-scale color offset after the display is switched to the other refresh rate. In the present application, the gamma curve is adjusted by using the third refresh rate between the first refresh rate and the second refresh rate, and at a same gray scale, the gray-level voltage of the adjusted gamma curve is between the gray-level voltage of the gamma curve corresponding to the first refresh rate and the gray-level voltage of the gamma curve corresponding to the second refresh rate. That is, the gray-level voltage of the adjusted gamma curve has a certain deviation relative to the gray-level voltage of the gamma curve corresponding to the first refresh rate, likewise, the gray-level voltage of the adjusted gamma curve also has a certain deviation relative to the gray-level voltage of the gamma curve corresponding to the second refresh rate, and a deviation of the gray-level voltage of the adjusted gamma curve relative to the gray-level voltage of the gamma curve corresponding to the first refresh rate and a deviation of the gray-level voltage of the adjusted gamma curve relative to the gray-level voltage of the gamma curve corresponding to the second refresh rate each are less than a deviation between the gray-level voltage of the gamma curve corresponding to the first refresh rate and the gray-level voltage of the gamma curve corresponding to the second refresh rate. At the same time, a discharge time of a gate capacitance of the drive transistor at the third refresh rate is between a discharge time of a gate capacitance of the drive transistor at the first refresh rate and a discharge time of a gate capacitance of the drive transistor at the second refresh rate, and an absolute value of a difference between a discharge time of the gate capacitance of the drive transistor at the third refresh rate and a discharge time of the gate capacitance of the drive transistor at the first refresh rate and an absolute value of a difference between a discharge time of the gate capacitance of the drive transistor at the third refresh rate and a discharge time of the gate capacitance of the drive transistor at the second refresh rate each are less than an absolute value of a difference between the discharge time of the gate capacitance of the drive transistor at the first refresh rate and the discharge time of the gate capacitance of the drive transistor at the second refresh rate. Therefore, when the display is switched between the first refresh rate and the second refresh rate, a difference in a gate potential of the drive transistor relative to a gray-level voltage of the gamma curve at different refresh rates can be reduced, and thus, the color offset degree at which the first refresh rate and the second refresh rate are switched is reduced, the issue of the luminance and color coordinate offset existing between different refresh rates when the gamma curve is shared is improved, and the display function of the display device is improved.

Figure 3:
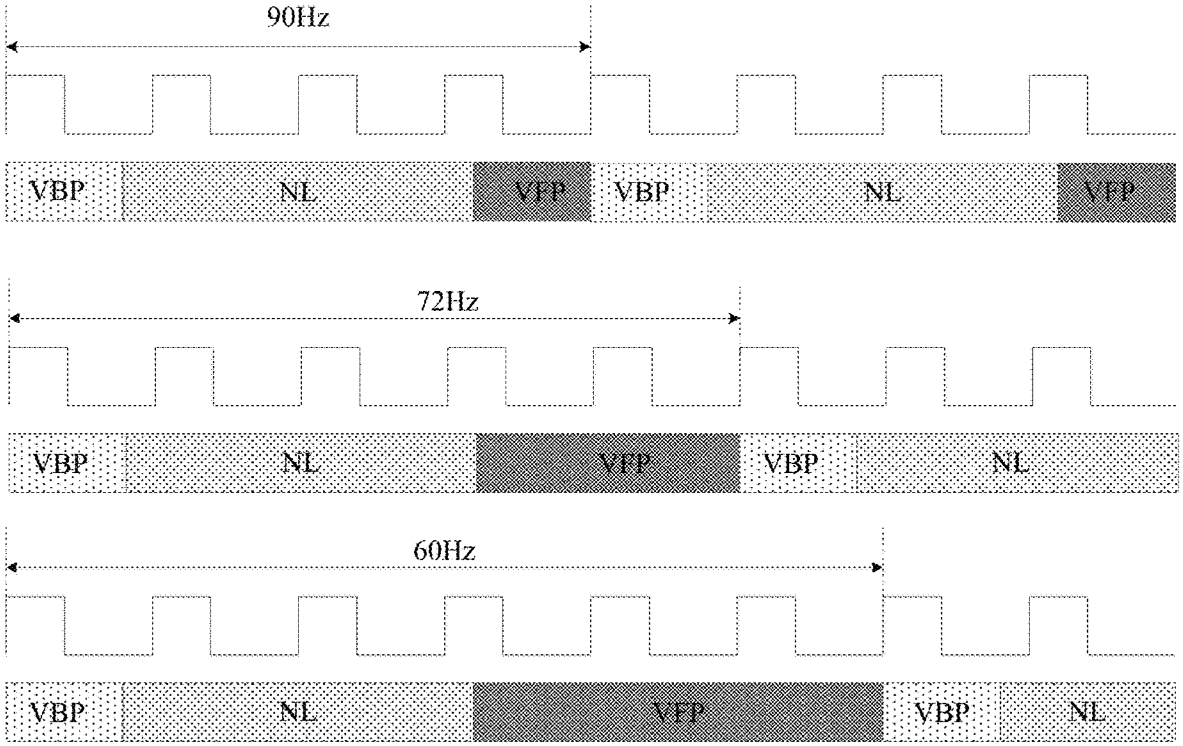
FIG. 3 is a timing comparison diagram of light-emitting control signals at different refresh rates according to the present application.

FIG. 3 is a timing comparison diagram of light-emitting control signals at different refresh rates according to the present application. With reference to FIG. 3, the first refresh rate is 90 Hz, the second refresh rate is 60 Hz, and the third refresh rate determined according to the light-emitting control signal at the refresh rate of 90 Hz and the light-emitting control signal at the refresh rate of 60 Hz and the reference duty cycle is 72 Hz. The gamma curve is adjusted according to the third refresh rate. At this time, the difference in discharge time is $\Delta t2=1/60-1/72$ when the display is switched from the first refresh rate of 90 Hz to the second refresh rate of 60 Hz. Whereas, in the related art, if the gamma curve is adjusted at the first refresh rate 90 Hz, the difference in discharge time is $\Delta t1=1/60-1/90$ when the gamma curve is shared to the refresh rate of 60 Hz, and a value of $\Delta t1$ is greater than a value of $\Delta t2$. Therefore, at the time of switching to the second refresh rate of 60 Hz, the deviation of a gray-level voltage of a gamma curve adjusted according to the third refresh rate relative to a gray-level voltage of a gamma curve corresponding to the second refresh rate is less than a deviation between a gray-level voltage of a gamma curve corresponding to the first refresh rate and a gray-level voltage of a gamma curve corresponding to the second refresh rate. Therefore, when the display is switched from the first refresh rate to the second refresh rate, the difference in the gate potential of the drive transistor relative to the gray-level voltage of the gamma curve at the second refresh rate can be reduced. Thus, the color offset degree when the display is switched from the first refresh rate to the second refresh rate is reduced, and likewise, the color offset degree when the display is switched from the second refresh rate to the first refresh rate is also reduced after the gamma curve is adjusted according to the third refresh rate.

Figure 4:
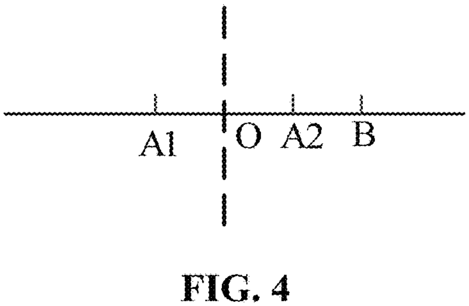
FIG. 4 is a comparison diagram of a color offset degree according to the present application.

Compared with the gamma curve being adjusted at the first refresh rate or the second refresh rate, when the gamma curve is adjusted according to the third refresh rate between the first refresh rate and the second refresh rate, the absolute value of the difference in discharge time of the gate capacitance of the drive transistor is relatively small at the time of switching to the first refresh rate or the second refresh rate. FIG. 4 is a comparison schematic diagram of a color offset degree according to the present application. With reference to FIG. 4, the first refresh rate of 90 Hz, the second refresh rate of 60 Hz, and the third refresh rate of 72 Hz are used as an example, the gamma curve adjusted at the third refresh rate is used as a reference, a first coordinate point O in FIG. 4 is a standard color at the third refresh rate, and the color offset degree is represented by the length of the line segment. Since the line segment OA1 is the color offset degree at the first refresh rate and the line segment OA2 is the color offset degree at the second refresh rate, the color offset degree is the length of the line segment OA1 or the length of the line segment OA2 relative to a standard color when the display device switches between the first refresh rate and the second refresh rate. However, if the gamma curve is adjusted at one refresh rate of the first refresh rate or the second refresh rate, for example, the gamma curve is adjusted at the first refresh rate, the color at the first refresh rate is the standard color, the first coordinate point O in FIG. 4 is the standard color at the first refresh rate, and at this time, when the display is switched from the first refresh rate to the second refresh rate, and the line segment OB is the color offset degree at the second refresh rate. It is apparent that the length of the line segment OB is larger than the length of the line segment OA1 or the length of the line segment OA2. That is, when the gamma curve is adjusted at the third refresh rate, the color at the third refresh rate is a standard color, the color offset between the first refresh rate and the third refresh rate is smaller, and the color offset between the second refresh rate and the third refresh rate is also smaller. Thus, when the display is switched between the first refresh rate and the second refresh rate, the color offset degree displayed by the display device is reduced, the color offset issue is improved, and the display function of the display device is improved.

The present application provides a method for adjusting a gamma curve, and the method includes that: the reference duty cycle of the light-emitting control signal is determined according to the duty cycle of the light-emitting control signal at the preset refresh rate; the third refresh rate is determined according to the light-emitting control signal at the first refresh rate, the light-emitting control signal at the second refresh rate and the reference duty cycle, where the third refresh rate is between the first refresh rate and the second refresh rate, and the duty cycle of the light-emitting control signal at the third refresh rate is equal to the reference duty cycle; and the gamma curve is adjusted according to the third refresh rate.

According to the technical scheme provided in the present application, the gamma curve is adjusted by using the third refresh rate between the first refresh rate and the second refresh rate, at a same gray scale, a gray-level voltage of the adjusted gamma curve has a certain deviation relative to a gray-level voltage of a gamma curve corresponding to the first refresh rate, likewise, the gray-level voltage of the adjusted gamma curve also has a certain deviation relative to a gray-level voltage of a gamma curve corresponding to the second refresh rate, and a deviation of a gray-level voltage of the adjusted gamma curve relative to the gray-level voltage of the gamma curve corresponding to the first refresh rate and a deviation of a gray-level voltage of the adjusted gamma curve relative to the gray-level voltage of the gamma curve corresponding to the second refresh rate each are less than a deviation between the gray-level voltage of the gamma curve corresponding to the first refresh rate and the gray-level voltage of the gamma curve corresponding to the second refresh rate. Therefore, when the display is switched between the first refresh rate and the second refresh rate, a difference in a gate potential of the drive transistor relative to the gray-level voltage of the gamma curve at different refresh rates can be reduced. Thus, the color offset degree at which the first refresh rate and the second refresh rate are switched is reduced, the issue of luminance and color coordinate offset existing between different refresh rates when the gamma curve is shared is improved, and the display function of the display device is improved.

The duty cycle of the light-emitting control signal at the first refresh rate is equal to the duty cycle of the light-emitting control signal at the second refresh rate, and the preset refresh rate is the first refresh rate or the second refresh rate. The third refresh rate is determined according to the light-emitting control signal at the first refresh rate, the light-emitting control signal at the second refresh rate and the reference duty cycle, and the third refresh rate is between the first refresh rate and the second refresh rate. That is, the third refresh rate is an intermediate refresh rate of the first refresh rate and the second refresh rate.

Figure 5:
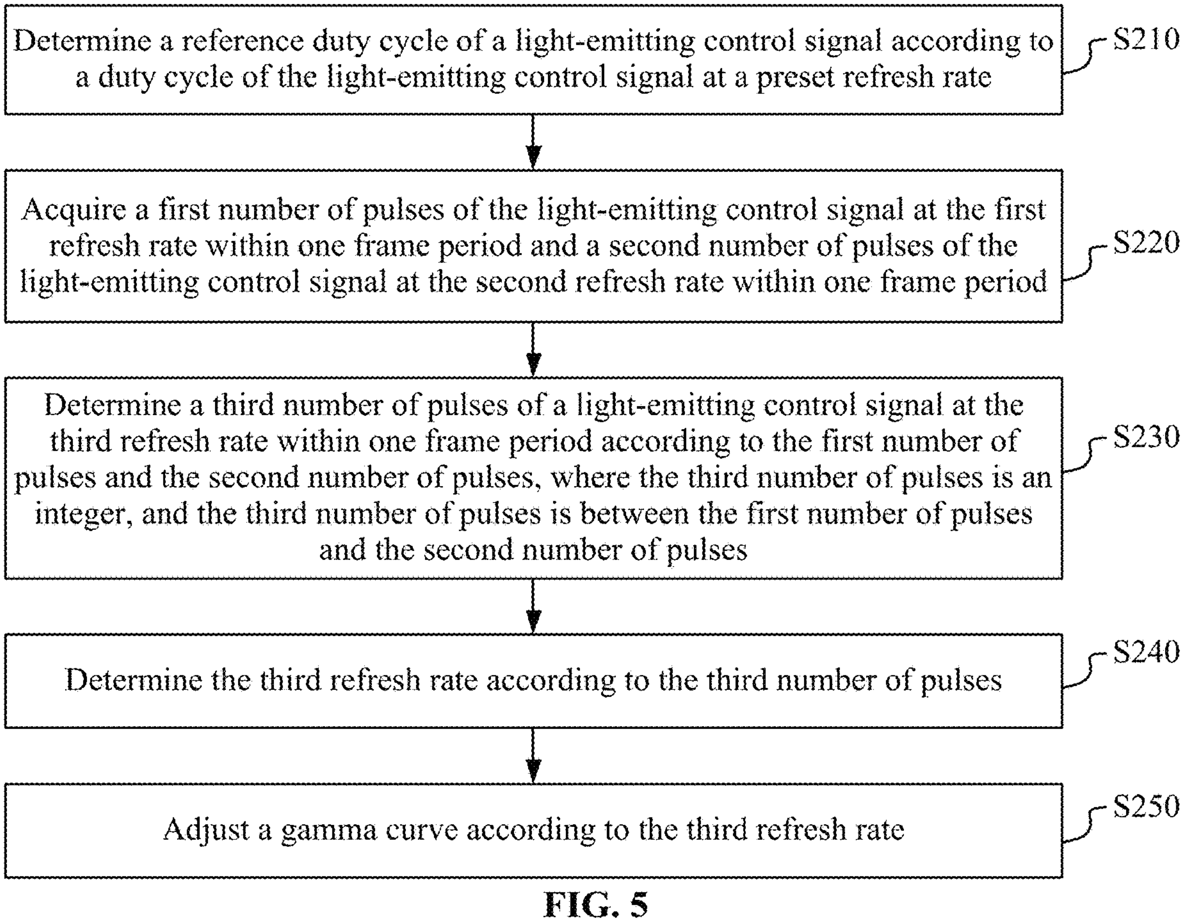
FIG. 5 is a flowchart of another method for adjusting a gamma curve according to the present application.

FIG. 5 is a flowchart of another method for adjusting a gamma curve according to the present application, and referring to FIG. 5, the method includes the steps described below.

In S210, a reference duty cycle of a light-emitting control signal is determined according to a duty cycle of the light-emitting control signal at a preset refresh rate.

In S220, the number of at least one first pulse of the light-emitting control signal within one frame period at a first refresh rate and the number of at least one second pulse of the light-emitting control signal within one frame period at a second refresh rate are acquired.

Specifically, the light-emitting control signal may be a multi-pulse signal, and the duty cycle of the light-emitting control signal at the first refresh rate is equal to the duty cycle of the light-emitting control signal at the second refresh rate. For example, referring to FIG. 3, the first refresh rate is 90 Hz, and the number of the at least one first pulse of the light-emitting control signal within one frame period at the first refresh rate is 4 pulse signals; the second refresh rate is 60 Hz, and since the duty cycle of the light-emitting control signal at the refresh rate of 90 Hz needs to be equal to the duty cycle of the light-emitting control signal at the refresh rate of 60 Hz, a luminance adjustment interval of the light-emitting control signal at the refresh rate of 60 Hz is changed to 6 pulse signals.

In S230, the number of at least one third pulse of the light-emitting control signal within one frame period at a third refresh rate is determined according to the number of the at least one first pulse and the number of the at least one second pulse, where the number of the at least one third pulse is an integer, and the number of the at least one third pulse is between the number of the at least one first pulse and the number of the at least one second pulse.

Specifically, with continued reference to FIG. 3, the first refresh rate is 90 Hz, and the number of the at least one first pulse of the light-emitting control signal within one frame period at the first refresh rate is 4 pulse signals; and the second refresh rate is 60 Hz, and the luminance adjustment interval of the light-emitting control signal is changed to 6 pulse signals. That is, the number of the at least one first pulse is 4 and the number of the at least one second pulse is 6, and the number of the at least one third pulse of the light-emitting control signal within one frame period at the third refresh rate is determined according to the number of the at least one first pulse and the number of the at least one second pulse. Since the number of the at least one third pulse is an integer, and the number of the at least one third pulse is between the number of the at least one first pulse and the number of the at least one second pulse, the number of the at least one third pulse of the light-emitting control signal within one frame period at the third refresh rate is 5.

Figure 6:
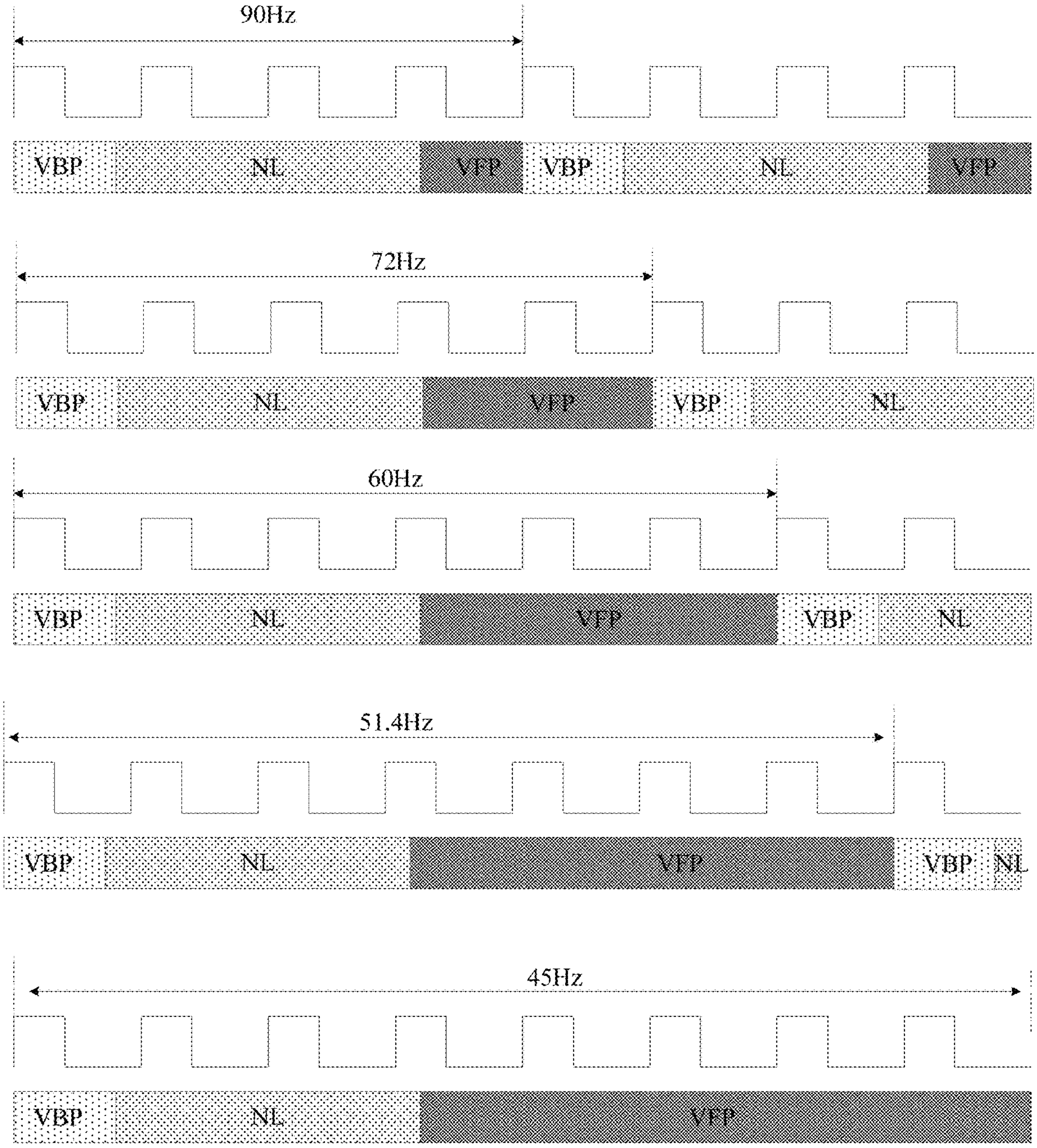
FIG. 6 is another timing comparison diagram of light-emitting control signals at different refresh rates according to the present application.

FIG. 6 is another timing comparison diagram of light-emitting control signals at different refresh rates according to the present application. With reference to FIG. 6, for example, the first refresh rate is 90 Hz, and the number of the at least one first pulse of the light-emitting control signal within one frame period at the first refresh rate is 4 pulse signals; the second refresh rate is 45 Hz, and the luminance adjustment interval of the light-emitting control signal is changed to 8 pulse signals. Thus, the number of the at least one third pulse determined according to the number of the at least one first pulse and the number of the at least one second pulse may be 5, 6 and 7.

In S240, the third refresh rate is determined according to the number of the at least one third pulse.

Specifically, the number of the at least one third pulse is between the number of the at least one first pulse and the number of the at least one second pulse, and the third refresh rate determined according to the number of the at least one third pulse is between the first refresh rate corresponding to the number of the at least one first pulse and the second refresh rate corresponding to the number of the at least one second pulse. For example, referring to FIG. 3, the first refresh rate is 90 Hz, and the number of the at least one first pulse of the light-emitting control signal within one frame period at the first refresh rate is 4 pulse signals; and the second refresh rate is 60 Hz, and the luminance adjustment interval of the light-emitting control signal is changed to 6 pulse signals. That is, the number of the at least one first pulse is 4 and the number of the at least one second pulse is 6, and thus the number of the at least one third pulse of the light-emitting control signal within one frame period at the third refresh rate determined according to the number of the at least one first pulse and the number of the at least one second pulse is 5. The refresh rate is 72 Hz when the number of pulses is 5, and thus the third refresh rate determined according to the light-emitting control signal at the refresh rate of 90 Hz, the light-emitting control signal at the refresh rate of 60 Hz and the reference duty cycle is 72 Hz.

Referring to FIG. 6, for example, the first refresh rate is 90 Hz, and the number of the at least one first pulse of the light-emitting control signal within one frame period at the first refresh rate is 4 pulse signals; and the second refresh rate is 45 Hz, and the luminance adjustment interval of the light-emitting control signal is changed to 8 pulse signals. Thus, the number of the at least one third pulse of the light-emitting control signal within one frame period at the third refresh rate determined according to the number of the at least one first pulse and the number of the at least one second pulse may be 5, 6 and 7. A refresh rate corresponding to the number of the at least one third pulse being 5 is 72 Hz, a refresh rate corresponding to the number of the at least one third pulse being 6 is 60 Hz, and a refresh rate corresponding to the number of the at least one third pulse being 7 is 51.4 Hz. That is, the third refresh rate may be 72 Hz, 60 Hz, or 51.4 Hz.

Optionally, after the third refresh rate is determined according to the number of the at least one third pulse, the method further includes that: the third refresh rate is adjusted by adjusting a field blanking time of the first refresh rate or a field blanking time of the second refresh rate.

Specifically, with reference to FIGS. 3 and 6, during a scan process in which an optical signal is converted into an electrical signal, the scan always starts from an upper left corner of an image, travels horizontally forward, and at the same time, a scan point also moves downward at a slower rate. When the scan point reaches an edge of a right side of the image, the scan point quickly returns to a left side, the scan restarts below a starting point of the first line and is performed on the second line, and a process of going back from line to line is referred to as a horizontal blanking. A complete image of scan signals, consisting of a sequence of row signals separated by horizontal blanking intervals, is referred to as a frame. After scanning one frame, the scan point returns from a lower right corner of the image to the upper left corner of the image and the scan of a new frame is started, and the time interval of this is referred to as a vertical blanking, also referred to as a field blanking. The third refresh rate is adjusted by adjusting the field blanking time of the first refresh rate or the field blanking time of the second refresh rate. The field blanking time is the time corresponding to a non-display stage.

If the first refresh rate is 90 Hz, the number of the at least one first pulse of the light-emitting control signal within one frame period at the first refresh rate is 4 pulse signals; and if the second refresh rate is 60 Hz, the luminance adjustment interval of the light-emitting control signal is changed to 6 pulse signals. By adjusting the field blanking time at the first refresh rate, the time corresponding to one pulse signal is added so as to change from 4 pulse signals to 5 pulse signals, and thus a third refresh rate corresponding to 5 pulse signals may be obtained, and at this time, the third refresh rate is 72 Hz. By adjusting the field blanking time at the second refresh rate, the time corresponding to one pulse signal is subtracted so as to change from 6 pulse signals to 5 pulse signals, and thus the third refresh rate corresponding to 5 pulse signals may be obtained, and at this time, the third refresh rate is 72 Hz.

If the first refresh rate is 90 Hz, the number of the at least one first pulse of the light-emitting control signal within one frame period at the first refresh rate is 4 pulse signals; and if the second refresh rate is 45 Hz, the luminance adjustment interval of the light-emitting control signal is changed to 8 pulse signals. Thus, the number of the at least one third pulse of the light-emitting control signal within one frame period at the third refresh rate determined according to the number of the at least one first pulse and the number of the at least one second pulse may be 5, 6 and 7. By adjusting the field blanking time at the first refresh rate, the time corresponding to one pulse signal is added so as to change from 4 pulse signals to 5 pulse signals, and thus the third refresh rate corresponding to 5 pulse signals may be obtained, and at this time, the third refresh rate is 72 Hz. The time corresponding to 2 pulse signals is added so as to change from 4 pulse signals to 6 pulse signals, and thus the third refresh rate corresponding to 6 pulse signals may be obtained, and at this time, the third refresh rate is 60 Hz. The time corresponding to 3 pulse signals is added so as to change from 4 pulse signals to 7 pulse signals, and thus the third refresh rate corresponding to 7 pulse signals may be obtained, and at this time, the third refresh rate is 51.4 Hz. By adjusting the field blanking time at the second refresh rate, the time corresponding to one pulse signal is subtracted so as to change from 8 pulse signals to 7 pulse signals, and thus the third refresh rate corresponding to 7 pulse signals may be obtained, and at this time, the third refresh rate is 51.4 Hz. The time corresponding to 2 pulse signals is subtracted so as to change from 8 pulse signals to 6 pulse signals, and thus the third refresh rate corresponding to 6 pulse signals may be obtained, and at this time, the third refresh rate is 60 Hz. The time corresponding to 3 pulse signals is subtracted so as to change from 8 pulse signals to 5 pulse signals, and thus the third refresh rate corresponding to 5 pulse signals may be obtained, and at this time, the third refresh rate is 72 Hz.

An absolute value of a difference between the number of the at least one third pulse and the number of the at least one first pulse is equal to an absolute value of a difference between the number of the at least one third pulse and the number of the at least one second pulse.

Specifically, the number of the at least one third pulse is determined, where an absolute value of a difference between the number of the at least one third pulse and the number of the at least one first pulse is equal to an absolute value of a difference between the number of the at least one third pulse and the number of the at least one second pulse. At this time, the refresh time corresponding to the third refresh rate (i.e., discharge time of the gate capacitance of the drive transistor at the third refresh rate) is determined according to the number of the at least one third pulse, where an absolute value of a time difference between the refresh time corresponding to the third refresh rate and the refresh time corresponding to the first refresh rate is equal to an absolute value of a time difference between the refresh time corresponding to the third refresh rate and the refresh time corresponding to the second refresh rate.

Referring to FIG. 3, if the first refresh rate is 90 Hz and the second refresh rate is 60 Hz, then the third refresh rate is 72 Hz. After the display is switched to the first refresh rate, a time difference between a discharge time of the gate capacitance of the drive transistor at the first refresh rate and a discharge time of the gate capacitance of the drive transistor at the third refresh rate is $\Delta t1=1/72-1/90$; and after the display is switched to the second refresh rate, a time difference between the discharge time of the gate capacitance of the drive transistor at the second refresh rate and the discharge time of the gate capacitance of the drive transistor at the third refresh rate is $\Delta t2=1/60-1/72$, and $\Delta t1=\Delta t2$ may be determined by calculation. Referring to FIG. 5, if the first refresh rate is 90 Hz and the second refresh rate is 45 Hz, then the third refresh rate is 60 Hz. After the display is switched to the first refresh rate, a time difference between the discharge time of the gate capacitance of the drive transistor at the first refresh rate and the discharge time of the gate capacitance of the drive transistor at the third refresh rate is $\Delta t3=1/60-1/90$; and after the display is switched to the second refresh rate, a time difference between the discharge time of the gate capacitance of the drive transistor at the second refresh rate and the discharge time of the gate capacitance of the drive transistor at the third refresh rate is $\Delta t4=1/45-1/60$, and $\Delta t3=\Delta t4$ may be determined by calculation. Compared with the first refresh rate and the second refresh rate, when the gamma curve is adjusted according to the third refresh rate between the first refresh rate and the second refresh rate, the amount of change in the discharge time of the gate capacitance of the drive transistor is equal. At this time, the gray-level voltage corresponding to the gamma curve adjusted at the third refresh rate may also equalize the color offset degree at the first refresh rate and the color offset degree at the second refresh rate. Therefore, the issue of luminance and color coordinate offset existing when the first refresh rate is switched to the second refresh rate and when the second refresh rate is switched to the first refresh rate is further improved, and the display function of the display device is improved.

In S250, the gamma curve is adjusted according to the third refresh rate.

According to the method for adjusting the gamma curve provided in the present application, the number of the at least one first pulse of the light-emitting control signal within one frame period at the first refresh rate and the number of the at least one second pulse of the light-emitting control signal within one frame period at the second refresh rate are acquired; and the number of the at least one third pulse of the light-emitting control signal within one frame period at the third refresh rate is determined according to the number of the at least one first pulse and the number of the at least one second pulse, where the number of the at least one third pulse is the integer, and the absolute value of the difference between the number of the at least one third pulse and the number of the at least one first pulse is equal to the absolute value of the difference between the number of the at least one third pulse and the number of the at least one second pulse. The third refresh rate is determined according to the number of the at least one third pulse, and at this time, the absolute value of the time difference between the refresh time corresponding to the third refresh rate and the refresh time corresponding to the first refresh rate is equal to the absolute value of the time difference between the refresh time corresponding to the third refresh rate and the refresh time corresponding to the second refresh rate. The gray-level voltage corresponding to the gamma curve adjusted at the third refresh rate may also equalize the color offset degree at the first refresh rate and the color offset degree at the second refresh rate. Therefore, the issue of luminance and color coordinate offset existing when the first refresh rate is switched to the second refresh rate and when the second refresh rate is switched to the first refresh rate is further improved, and the display function of the display device is improved.

Figure 7:
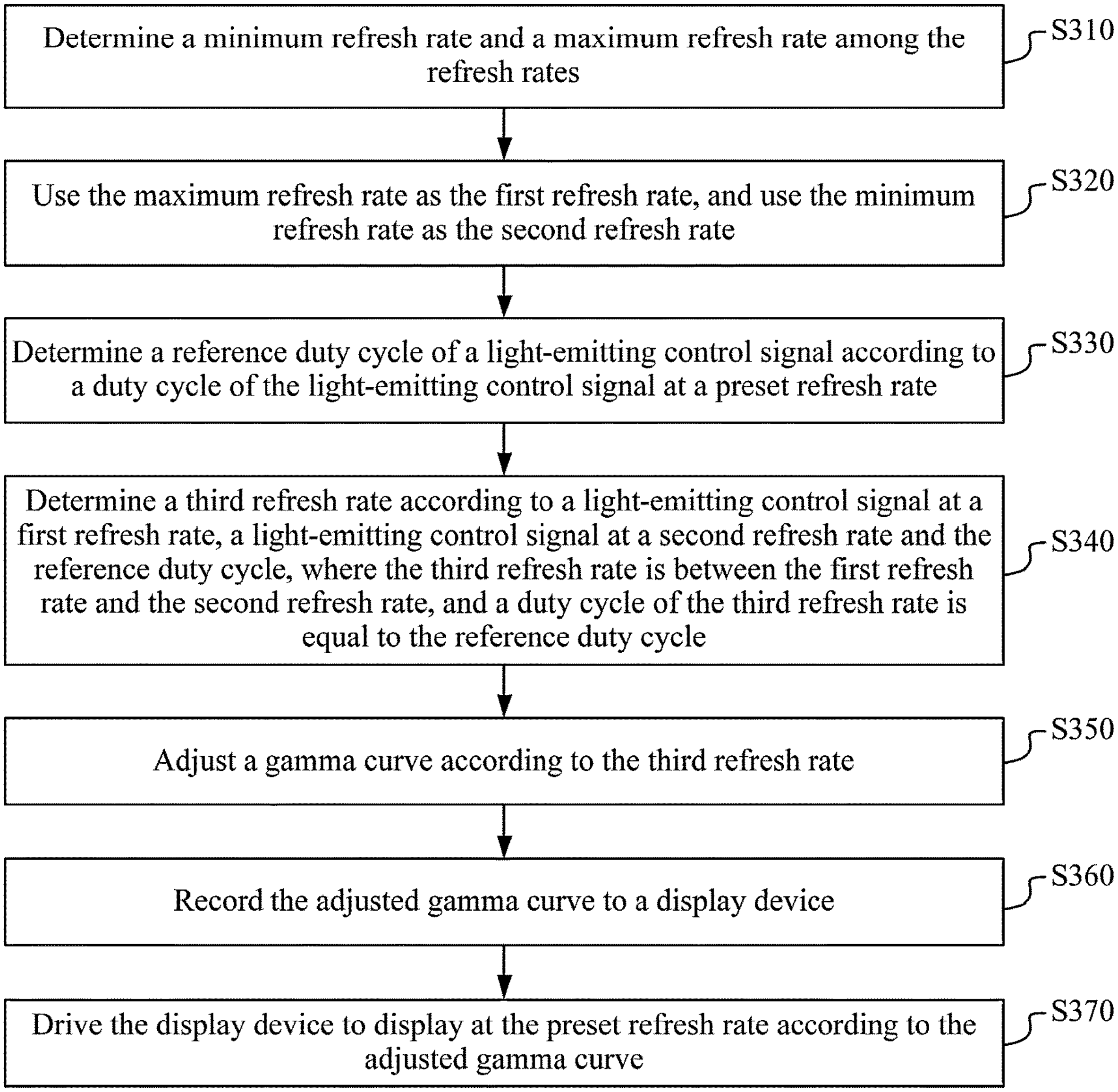
FIG. 7 is a flowchart of another method for adjusting a gamma curve according to the present application.

FIG. 7 is a flowchart of another method for adjusting a gamma curve provided in the present application. Referring to FIG. 7, the method includes the steps described below.

In S310, a minimum refresh rate and a maximum refresh rate among a first refresh rate, a second refresh rate and a fourth refresh rate are determined.

Specifically, the preset refresh rates of the OLED display device may further include the fourth refresh rate, i.e., the refresh rate of the OLED display device may be switched between the first refresh rate, the second refresh rate, and the fourth refresh rate. Before the third refresh rate is determined according to the first refresh rate and the second refresh rate, a minimum refresh rate and a maximum refresh rate among the preset refresh rates of the OLED display device also need to be determined. That is, the minimum refresh rate among the first refresh rate, the second refresh rate and the fourth refresh rate and the maximum refresh rate among the first refresh rate, the second refresh rate and the fourth refresh rate are determined.

In S320, the first refresh rate is updated to the maximum refresh rate, and the second refresh rate is updated to the minimum refresh rate.

Specifically, after the minimum refresh rate and the maximum refresh rate among the preset refresh rates of the OLED display device are determined, the first refresh rate among the three preset refresh rates is updated to the maximum refresh rate, and the second refresh rate among the three preset refresh rates is updated to the minimum refresh rate. That is, when the number of preset refresh rates that the OLED display device can support is three, the third refresh rate at which the shared gamma curve is determined according to the maximum refresh rate among the three preset refresh rates and the minimum refresh rate among the three preset refresh rates. This improves the issue of luminance and color coordinate offset existing in the case of switching between the first refresh rate, the second refresh rate, and the fourth refresh rate, and thus the display function of the display device is improved.

In another embodiment of this scheme, the preset refresh rates of the OLED display device may include three or more refresh rates, and the third refresh rate at which the shared gamma curve is adjusted is determined according to a maximum refresh rate among the three or more preset refresh rates and a minimum refresh rate among the three or more preset refresh rates. This improves the issue of luminance and color coordinate offset existing in the case of switching between three or more preset refresh rates, and thus the display function of the display device is further improved.

In S330, a reference duty cycle of a light-emitting control signal is determined according to a duty cycle of the light-emitting control signal at a preset refresh rate.

In S340, a third refresh rate is determined according to a light-emitting control signal at a first refresh rate, a light-emitting control signal at a second refresh rate and the reference duty cycle, where the third refresh rate is between the first refresh rate and the second refresh rate, and a duty cycle of the light-emitting control signal at the third refresh rate is equal to the reference duty cycle.

In S350, the gamma curve is adjusted according to the third refresh rate.

In S360, the adjusted gamma curve is recorded to a display device.

Specifically, after the gamma curve is adjusted according to the third refresh rate, the gamma curve is recorded to a one-time programmable read-only memory (OTPROM, referred to as OTP), and the OTP is located in a driver chip of the display device.

In S370, the display device is driven to display at the preset refresh rate according to the adjusted gamma curve.

Specifically, the driver chip drives the display device to display at the preset refresh rate according to the gamma curve adjusted at the third refresh rate. The gamma curve is adjusted by using the third refresh rate between the first refresh rate and the second refresh rate, and at a same gray scale, the gray-level voltage of the adjusted gamma curve is between the gray-level voltage of the gamma curve corresponding to the first refresh rate and the gray-level voltage of the gamma curve corresponding to the second refresh rate, that is, the gray-level voltage of the adjusted gamma curve has a certain deviation relative to the gray-level voltage of the gamma curve corresponding to the first refresh rate, likewise, the gray-level voltage of the adjusted gamma curve also has a certain deviation relative to the gray-level voltage of the gamma curve corresponding to the second refresh rate, and a deviation of the gray-level voltage of the adjusted gamma curve relative to the gray-level voltage of the gamma curve corresponding to the first refresh rate and a deviation of the gray-level voltage of the adjusted gamma curve relative to the gray-level voltage of the gamma curve corresponding to the second refresh rate each are less than a deviation between the gray-level voltage of the gamma curve corresponding to the first refresh rate and the gray-level voltage of the gamma curve corresponding to the second refresh rate. Therefore, when the display is switched between the first refresh rate and the second refresh rate, the difference in gate potential of the drive transistor relative to the gray-level voltage of the gamma curve at different refresh rates may be reduced, and thus, the color offset degree at which the first refresh rate and the second refresh rate are switched is reduced, the issue of luminance and color coordinate offset existing between different refresh rates when the gamma curve is shared is improved, and the display function of the display device is improved.

Figure 8:
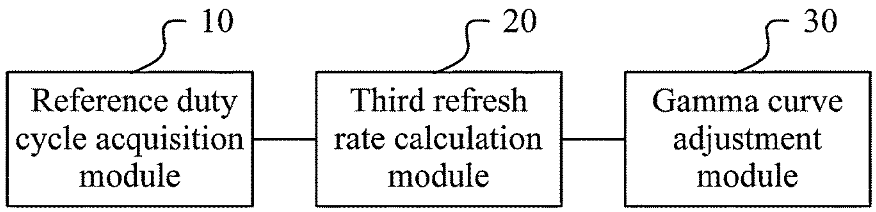
FIG. 8 is a structural block diagram of a device for adjusting a gamma curve according to the present application.

The present application further provides a device for adjusting a gamma curve, and the device for adjusting the gamma curve is configured to perform the method for adjusting a gamma curve described in any of the embodiments described above. FIG. 8 is a structural block diagram of a device for adjusting a gamma curve according to the present application, and referring to FIG. 8, the adjustment device includes a reference duty cycle acquisition module 10, a third refresh rate calculation module 20 and a gamma curve adjustment module 30. The reference duty cycle acquisition module 10 is configured to determine a reference duty cycle of a light-emitting control signal according to a duty cycle of the light-emitting control signal at a preset refresh rate. The third refresh rate calculation module 20 is configured to determine a third refresh rate according to a light-emitting control signal at a first refresh rate, a light-emitting control signal at a second refresh rate and the reference duty cycle, where the third refresh rate is between the first refresh rate and the second refresh rate, and a duty cycle of the light-emitting control signal at the third refresh rate is equal to the reference duty cycle. The gamma curve adjustment module 30 is configured to adjust the gamma curve according to the third refresh rate.

Specifically, the device for adjusting the gamma curve includes the reference duty cycle acquisition module 10, the third refresh rate calculation module 20 and the gamma curve adjustment module 30. The reference duty cycle acquisition module 10 is configured to determine the reference duty cycle of the light-emitting control signal according to the duty cycle of the light-emitting control signal at the preset refresh rate. The OLED display device supports multiple refresh rates, the duty cycle of the light-emitting control signal at each refresh rate is the same, and the reference duty cycle of the light-emitting control signal of the OLED display device may be determined according to the duty cycle of the light-emitting control signal at one refresh rate supported by the OLED display device. That is, the reference duty cycle acquisition module may determine the reference duty cycle of the light-emitting control signal according to the duty cycle of the light-emitting control signal at any one of the preset refresh rates.

The third refresh rate calculation module 20 is configured to determine the third refresh rate according to the light-emitting control signal at the first refresh rate, the light-emitting control signal at the second refresh rate and the reference duty cycle. The multiple refresh rates include a first refresh rate and a second refresh rate, the duty cycle of the light-emitting control signal at the first refresh rate is equal to the duty cycle of the light-emitting control signal at the second refresh rate, and the preset refresh rate is the first refresh rate or the second refresh rate. The third refresh rate calculation module 20 is configured to determine a third refresh rate according to the light-emitting control signal at the first refresh rate, the light-emitting control signal at the second refresh rate and the reference duty cycle, where the third refresh rate is between the first refresh rate and the second refresh rate. That is, the third refresh rate is an intermediate refresh rate of the first refresh rate and the second refresh rate.

The gamma curve adjustment module 30 is configured to adjust the gamma curve according to the third refresh rate. The adjusted gamma curve is a shared gamma curve for the display device. If the gamma curve is adjusted at one refresh rate of the first refresh rate or the second refresh rate, the difference in discharge time will cause the serious issue of a low luminance and a low gray-scale color offset of the other refresh rate after the display is switched to the other refresh rate. In the present application, the gamma curve is adjusted by using an intermediate refresh rate, i.e., the third refresh rate, between the first refresh rate and the second refresh rate, and at a same gray scale, the gray-level voltage of the adjusted gamma curve is between the gray-level voltage of the gamma curve corresponding to the first refresh rate and the gray-level voltage of the gamma curve corresponding to the second refresh rate, that is, the gray-level voltage of the adjusted gamma curve has a certain deviation relative to the gray-level voltage of the gamma curve corresponding to the first refresh rate, likewise, the gray-level voltage of the adjusted gamma curve also has a certain deviation relative to the gray-level voltage of the gamma curve corresponding to the second refresh rate, and a deviation of the gray-level voltage of the adjusted gamma curve relative to the gray-level voltage of the gamma curve corresponding to the first refresh rate and a deviation of the gray-level voltage of the adjusted gamma curve relative to the gray-level voltage of the gamma curve corresponding to the second refresh rate each are less than a deviation between the gray-level voltage of the gamma curve corresponding to the first refresh rate and the gray-level voltage of the gamma curve corresponding to the second refresh rate. At the same time, a discharge time of the gate capacitance of the drive transistor at the third refresh rate is between a discharge time of the gate capacitance of the drive transistor at the first refresh rate and a discharge time of the gate capacitance of the drive transistor at the second refresh rate, an absolute value of a difference between a discharge time of the gate capacitance of the drive transistor at the third refresh rate and a discharge time of the gate capacitance of the drive transistor at the first refresh rate and an absolute value of a difference between a discharge time of the gate capacitance of the drive transistor at the third refresh rate and a discharge time of the gate capacitance of the drive transistor at the second refresh rate each are less than an absolute value of a difference between the discharge time of the gate capacitance of the drive transistor at the first refresh rate and the discharge time of the gate capacitance of the drive transistor at the second refresh rate. Therefore, when the display is switched between the first refresh rate and the second refresh rate, a difference in a gate potential of the drive transistor relative to a gray-level voltage of the gamma curve at different refresh rates can be reduced, and thus, the color offset degree at which the first refresh rate and the second refresh rate are switched is reduced, and the issue of luminance and color coordinate offset existing between different refresh rates when the common gamma curve is shared is improved, and the display function of the display device is improved.

Figure 9:
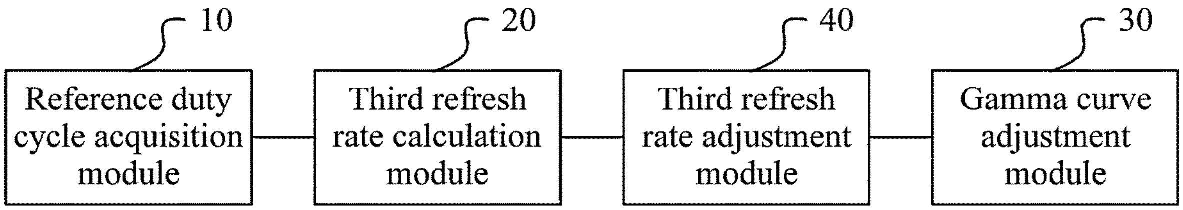
FIG. 9 is a structural block diagram of another device for adjusting a gamma curve according to the present application.

Optionally, FIG. 9 is a structural block diagram of another device for adjusting a gamma curve according to the present application, and referring to FIG. 9, the device for adjusting a gamma curve further includes a third refresh rate adjustment module 40. The third refresh rate adjustment module 40 is configured to adjust the third refresh rate by adjusting a field blanking time of the first refresh rate or a field blanking time of the second refresh rate.

Figure 10:
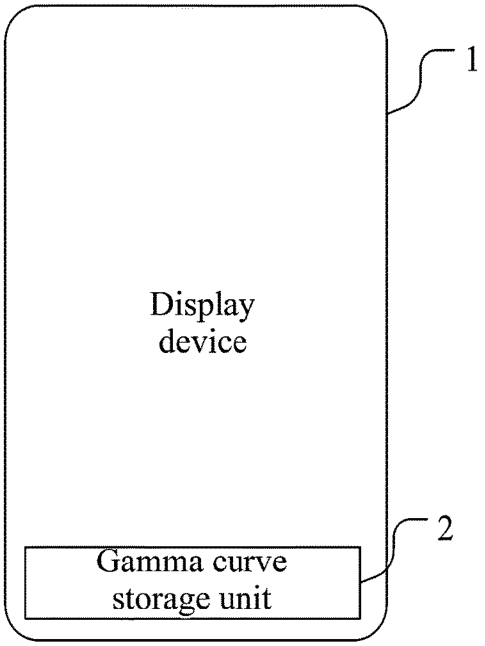
FIG. 10 is a structural block diagram of a display device according to the present application.

FIG. 10 is a structural block diagram of a display device according to the present application. Referring to FIG. 10, the present application further provides a display device 1, the display device 1 includes a gamma curve storage unit 2, the gamma curve storage unit 2 is configured to store a gamma curve acquired by the method for adjusting a gamma curve described in any of the above embodiments, and the gamma curve storage unit 2 may be a gamma register. Since the gamma curve stored in the gamma curve storage unit 2 is the gamma curve acquired by the method for adjusting a gamma curve described in any of the above embodiments, so that the same technical effect is provided and will not be repeated here.

It should be noted that the above are merely preferred embodiments of the present application and the technical principles applied herein. It should be understood by those skilled in the art that the present application is not limited to the particular embodiments described herein. For those skilled in the art, various apparent modifications, adaptations and substitutions may be made without departing from the scope of protection of the present application. Therefore, although the present application has been described in detail through the above embodiments, the present application is not limited to the above embodiments and may include other equivalent embodiments without departing from the concept of the present application. The scope of the present application is determined by the scope of the appended claims.

What is claimed is:

1. A method for adjusting a gamma curve, comprising:

determining a reference duty cycle of a light-emitting control signal according to a duty cycle of the light-emitting control signal at a preset refresh rate;

determining a third refresh rate according to the light-emitting control signal at a first refresh rate, the light-emitting control signal at a second refresh rate, and the reference duty cycle, wherein the third refresh rate is between the first refresh rate and the second refresh rate, and a duty cycle of the light-emitting control signal at the third refresh rate is equal to the reference duty cycle; and adjusting the gamma curve according to the third refresh rate, wherein a duty cycle of the light-emitting control signal at the first refresh rate is equal to a duty cycle of the light-emitting control signal at the second refresh rate, and the preset refresh rate is the first refresh rate or the second refresh rate.

2. The method of claim 1, wherein the light-emitting control signal is a multi-pulse signal; and wherein determining the third refresh rate according to the light-emitting control signal at the first refresh rate, the light-emitting control signal at the second refresh rate, and the reference duty cycle comprises:

acquiring a number of at least one first pulse of the light-emitting control signal within one frame period at the first refresh rate and a number of at least one second pulse of the light-emitting control signal within one frame period at the second refresh rate;

determining a number of at least one third pulse of the light-emitting control signal within one frame period at the third refresh rate according to the number of the at least one first pulse and the number of the at least one second pulse, wherein the number of the at least one third pulse is an integer, and the number of the at least one third pulse is between the number of the at least one first pulse and the number of the at least one second pulse; and determining the third refresh rate according to the number of the at least one third pulse.

3. The method of claim 2, wherein after determining the third refresh rate according to the number of the at least one third pulse, the method further comprises:

adjusting the third refresh rate by adjusting a field blanking time of the first refresh rate or a field blanking time of the second refresh rate.

4. The method of claim 2, wherein an absolute value of a difference between the number of the at least one third pulse and the number of the at least one first pulse is equal to an absolute value of a difference between the number of the at least one third pulse and the number of the at least one second pulse.

5. The method of claim 1, wherein a fourth refresh rate is further provided; and wherein before determining the third refresh rate according to the light-emitting control signal at the first refresh rate, the light-emitting control signal at the second refresh rate and the reference duty cycle, the method further comprises:

determining a minimum refresh rate and a maximum refresh rate among the first refresh rate, the second refresh rate and the fourth refresh rate;

updating the first refresh rate to the maximum refresh rate; and updating the second refresh rate to the minimum refresh rate.

6. The method of claim 1, wherein after adjusting the gamma curve according to the third refresh rate, the method further comprises:

recording an adjusted gamma curve to a display device; and driving the display device to display at the preset refresh rate according to the adjusted gamma curve.

7. The method of claim 1, wherein the third refresh rate is one of a plurality of refresh rates between the first refresh rate and the second refresh rate.

8. A device for adjusting a gamma curve which is configured to perform the method of claim 1.

9. The device of claim 8, wherein the device is further configured to adjust the third refresh rate by adjusting a field blanking time of the first refresh rate or a field blanking time of the second refresh rate.

10. A display device, comprising a memory, wherein the memory is configured to store the gamma curve adjusted according to the method of claim 1.

11. The display device of claim 10, wherein the memory is a gamma register.

12. The display device of claim 10, wherein the memory is a one-time programmable read-only memory, and the gamma curve is recorded into the one-time programmable read-only memory.

* * * * *